Aug. 9, 1938.  H. MUTH ET AL  2,126,027
ELECTRICAL CONDENSER
Filed March 28, 1934
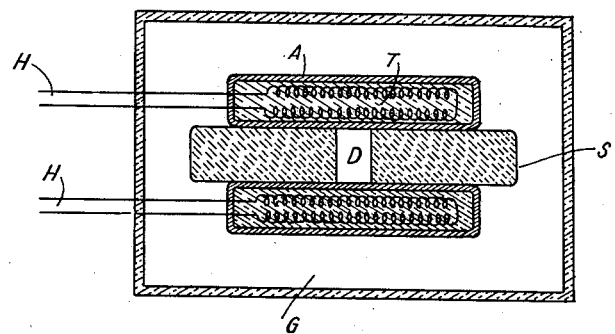
INVENTORS
HERBERT MUTH
WILHELM BUNGE
BY
ATTORNEY Patented Aug. 9, 1938

2,126,027

UNITED STATES PATENT OFFICE 2,126,027

ELECTRICAL CONDENSER

Herbert Muth and Wilhelm Runge, Berlin, Germany, assignors to Telefunken Gesellschaft für Drahtlose Telegraphie m. b. H., Berlin, Germany, a corporation of Germany Application March 28, 1934, Serial No. 717,790
In Germany April 21, 1933

2 Claims. (Cl. 175—41)

This invention relates to a condenser independent of temperature, in which capacitive changes caused by variations of the dielectric constant of the dielectric are to be avoided.

Condensers are already known, in which the electrode material is so chosen, that capacitive changes, caused by deformations of the electrodes at temperature variations, do not occur, or are negligibly small. Such condensers for instance, provide ceramic material as the supporting substance for the capacitive layers. There namely exist certain ceramic materials, whose thermal expansion coefficient is very small. In such condensers a further source detrimental to the constancy with regard to temperature, resides in the change of the dielectric properties of the dielectric.

In accordance with the invention, substances are used as dielectric, whose dielectric constant is practically independent of the temperature within the temperature range in which the condenser is intended to operate. Many substances, for instance Rochelle-salt or sodium potassium tartrate have the property of first increasing the dielectric constant at increasing temperature, thereafter maintaining it constant within a certain range, and after exceeding this temperature interval, decreasing or increasing its dielectric constant. Such substances, therefore are utilized within the scope of the present invention. The choice of such substances must be made by bearing in mind that the temperature at which the condenser is intended to operate lies within the range of dielectric constants that are independent of temperature. For practical purposes it is sufficient if $$\frac{1}{\epsilon} \times \frac{\partial \epsilon}{\partial t} < 10^{-5}$$

($\epsilon$=dielectric constant). It may eventually be advisable, if this temperature range does not coincide with the working temperatures, to bring the condenser to a suitable temperature by the use of artificial means, for instance to cool off the same or to heat it.

An embodiment of the invention is shown in the drawing by way of example.

The metallic condenser layers are indicated as "A", applied to a ceramic supporting body T in the form of metallized surfaces which act as the condenser electrode. The ceramic supporting body as well as the spacers D which mechanically space the metallic layers apart are so chosen, that at temperature variations, no appreciable changes in the capacity are practically produced. As the dielectric there serves a substance S formed of a material possessing within a certain temperature range, a dielectric constant which is independent of temperature. The condenser is enclosed within a heat proof casing G which should be constructed in the manner of casings as ordinarily used for thermostats, in order to reduce as much as possible the amount of heat delivered to the casings but inside the casings is coated with any suitable material which is a poor conductor of heat, such as glass, wool and so forth. The heat proof casing G is electrically maintained at a suitable temperature by means of a heating winding H embedded in the ceramic supporting body. In place of a heating winding, a cooling coil may be provided in suitable cases arranged within the ceramic body and circulated by water, for instance.

The invention is also applicable to air-gas or liquid condensers in which insulating spacers are disposed between the layers and where it is aimed at avoiding changes in the capacity caused by the dependency upon temperature of the dielectric constants of the spacers.

We claim:

1. A condenser whose capacity remains substantially constant with temperature changes comprising electrodes for said condenser each formed of a ceramic body covered with a metallic coating, a dielectric of sodium potassium tartrate interposed between said electrodes, said dielectric having a constant independent of temperature within a range of temperature, means to maintain the temperature within said range comprising a heating coil located within said ceramic body.

2. A condenser whose capacity remains substantially constant with temperature changes comprising electrodes for said condenser each formed of a ceramic body covered with a metallic coating, a dielectric of sodium potassium tartrate interposed between said electrodes, said dielectric having a constant independent of temperature within a range of temperature, means to maintain the temperature within said range comprising a cooling coil located within said ceramic body.

HERBERT MUTH.
WILHELM RUNGE.